United States Patent Office

3,357,876
Patented Dec. 12, 1967

3,357,876
METHOD OF STRENGTHENING A GLASS
ARTICLE BY ION EXCHANGE
Dale Welling Rinehart, Natrona Heights, Pa., assignor to Pittsburgh Plate Glass Company, Pittsburgh, Pa., a corporation of Pennsylvania
No Drawing. Filed Jan. 19, 1965, Ser. No. 426,676
13 Claims. (Cl. 161—1)

This application is a continuation-in-part of application Ser. No. 293,271, filed July 8, 1963, and now abandoned.

This invention is directed to strengthened soda-lithia-phosphorus pentoxide (hereinafter referred to as $P_2O_5$)-alumina-silica glass articles containing from about 1 to 25 percent by weight of $P_2O_5$ and methods for preparing such articles.

According to this invention, glass articles of greatly enhanced surface compressive stress, and hence load strength as well as increased durability against moisture vapor attack can be produced by rapidly contacting a lithia-soda-alumina-silica glass containing from 1 to about 25 percent by weight $P_2O_5$ with a salt of an alkali metal of larger atomic diameter than lithium at a temperature below the strain point of said glass for a sufficient period of time to introduce said larger atomic diameter alkali metal into the surface of said glass thereby substantially increasing the surface compressive stress and load strength thereof.

A special advantage attendant to the use of the present invention resides in the fact that thin glass articles, viz., having a thickness of the order 0.060 to 0.125 inch and even thinner can be provided with a surface compressive stress far greater than that presently attainable in thicker glass articles by physical tempering methods, e.g., thermal tempering procedures, yet possess the desirable small particle break pattern characteristic of thermally tempered glass when broken.

Of course, thicker lithia-soda-alumina-silica glasses containing the requisite amounts of $P_2O_5$ can also be produced in accordance with this invention, and such thicker glass articles, ranging from thickness of about 0.125 inch up to about 1.0 inch and even thicker can be provided with greatly enhanced surface compressive stress in accordance with this invention.

The present invention is especially valuable because the substantial increases in surface compressive stress are imparted to the glass in depths sufficient to withstand the strength reducing effect of surface scratches and other abrasions, e.g., such as result from day-to-day handling. Moreover, the strengthened glass articles produced according to this invention are stronger and less subject to failure under impact loads than untreated glass. This greater depth of strength is an advantageous feature of this invention which is not present in exchange strengthened glass having shallow depths of surface compression such as soda-lime glass articles in which the strengthened surface zone does not exceed 10 microns in depth.

Another salient advantage of the present invention is that the above mentioned desirable properties can be secured by a reasonably rapid one-stage treatment of the starting glass (base glass composition). In fact, exceptionally good results have been secured in accordance with this invention in treating periods of the order of 15 to 45 minutes and even shorter.

It is known that the treatment of soda-lime-silica glass, for example, by immersion of the glass in molten potassium nitrate to exchange a larger atom, e.g., potassium from the treating salt for the sodium in the glass, can be performed in order to improve the strength of the glass and impart increased surface compression thereto. However, the depth of the glass in a state of increased compression normally is quite shallow, usually not exceeding 4 to 5 microns and rarely exceeding 10 microns even after very long immersions, e.g., of the order of 8 to 16 hours or more. Glass having such shallow surface portions under compression is subject to substantial reductions in strength due to abrasions resulting from ordinary handling and wear and tear such as scratches which potentially can be deep enough to penetrate a substantial portion or all of such surface portion thus substantially reducing the strength of the glass.

In contrast, by practicing the present invention surface compression zones which exceed 10 microns and range from 30 to 200 microns and even deeper can be obtained readily and without difficulty in a reasonably rapid treatment. Thus, according to this invention soda-lithia-alumina-silica glasses containing from about 1 to 25 percent by weight $P_2O_5$ can be substantially strengthened and provided with a durable surface portion which is under greatly enhanced surface compressive stress to such a depth as to decrease substantially the likelihood of severe reduction of glass strength due to scratches and other surface abrasions occasioned by ordinary wear and tear.

A further advantage is that the chemical durability and moisture resistance of the glass thus obtained is not deleteriously affected by the treatment, and as far as moisture resistance is concerned, the strengthened glass articles of this invention are superior not only to both ordinary plate and sheet glass, viz., ordinary soda-lime-silica glasses but also to potassium exchange strengthened soda-lime glasses. This is particularly true, when according to this invention sodium is employed as the larger atomic diameter alkali metal for the strengthening treatment.

The strengthened glass articles of the present invention characteristically possess optical stress profiles ranging from (1) parabolic shaped stress profiles wherein both major glass surfaces are in a state of high compressive stress and the center of the glass is in a state of high center tension; to (2) stress profiles resembling a cross section of a frustum with rounder upper edges wherein both major glass surfaces are in a state of high compressive stress and the center of the glass is in a state of low center tension, viz., center tensions approximating and even below that of conventionally annealed glass sheets. Moreover, strengthened glass articles having a wide variety of stress profiles intermediate between (1) and (2) can be produced in accordance with this invention. Hence, highly strengthened glass articles having high surface compressive stress and load strength can be produced with virtually tailor-made center tensions ranging from exceedingly high to very low, depending upon the following factors, among others: thickness of the exchange strengthened zone and magnitude of compressive stress therein in relation to glass thickness; the specific composition of base glass to that there should be sufficient smaller atomic diameter alkali metal in the base glass composition so that sufficient sites are available for exchange by the larger atomic diameter alkali metal or metals employed in the strengthened treatment; the specific temperature below the strain point at which the exchange treatment is conducted for a given period of time; the nature of the alkali metal of larger atomic diameter employed for strengthening, viz., a potassium exchange to a given depth produces more center tension on a sample of given thickness than does a sodium exchange for the same penetration on the same thickness glass, etc.

Glass articles having parabolic stress profiles can be prepared, e.g., by subjecting relatively thin to very thin soda-lithia-$P_2O_5$-alumina-silica glass articles containing from about 1 to 25 percent by weight $P_2O_5$ to the strengthening procedures of the present invention, the maximum surface compressive stress and load strength in such treated glass articles can be as high as 100,000 pounds per square inch or even higher, especially in thin to very thin glass sheets having a thickness ranging from 0.125 to 0.060 inch and below and a larger atomic diameter alkali metal exchange into the surface compressive stress zone for depths of the order of 100 to 350 microns and 50 to 190 microns, respectively in each major surface thereof. Such strengthened glass articles possess load strengths exceeding their surface compressive stress.

Such glass articles have the advantages, among others, of extremely high surface compressive stress and load strengths substantially in excess of that attainable by physical tempering methods on substantially thicker glass articles plus the small particle break pattern of thermally tempered glass, or even smaller. Such highly strengthened articles can be made very thin, e.g., 0.060 inch and even thinner and are useful as monolithic automotive sidelights and backlights, etc.

The thicker highly strengthened articles can be employed as polylithic laminated windshields of the safety-glass type for automotive and other vehicle and compartment viewing closures; spandrels; etc. These strong articles can be tailor-made to have high, medium, or low center tensions in accordance with this invention.

Also in accordance with this invention, thicker soda-lithia-$P_2O_5$-alumina-silica glass articles can be strengthened and provided not only with the highly desired increased surface compressive stress, but also having a comparatively low magnitude of center tension, e.g., usually approximately or slightly above that of annealed glass of the same composition, viz., from 10 to 500 pounds per square inch. Also within the purview of this invention by subjecting these thicker articles to extended exchange treatments at high temperatures yet below the glass strain point, a high degree of center tension can be imparted thereto. The strengthened glass articles of this invention can have a larger atomic diameter alkali metal exchange induced surface compressive stress zone ranging from 30 to 400 microns or more in depth in each major surface thereof for glass thicknesses ranging from about 0.090 to 1.0 inch and even thicker. Such glass articles can have a maximum surface compressive stress as high as 100,000 pounds per square inch and even higher.

Of course, a wide range of center tension profiles intermediate between the extremely high and extremely low center tension stress profiles mentioned above can also be achieved within the purview of this invention by varying glass thickness, and depth and magnitude of the surface compressive stress zone in relation to the total thickness of the treated glass articles.

In the case of thicker glass articles strengthened in accordance with this invention, e.g., of 0.250 inch and above and having comparatively low center tensions, the maximum compressive stress in the surface compressive stress zone is far greater than the maximum tensile stress in the central interior stress zone (center tension zone). In fact in such glass articles the ratio of maximum compressive stress in the surface zone to maximum tensile stress in the center zone for larger alkali metal exchange penetrations approximating 100 microns is always at least 10 to 1, usually 50 to 1 and even greater for center tension not exceeding approximately 1,000 pounds per square inch. Of course, this ratio increases as depth of ion exchange penetration decreases, e.g., at penetrations of about 30 microns, this ratio approximates 250 to 1 and even higher. Such strengthened glass articles having a comparatively low center tension have the advantages, among others, of high surface compressive stress greatly in excess of that attainable by thermal tempering plus the advantageous characteristic of being able to be cut to desired configurations after strengthening treatment without shattering. This latter advantage cannot be secured with thermally tempered glass of reasonably high compressive stress, e.g., 20,000 pounds per square inch and above, because such thermally tempered glass shatters when cut. Such glass articles are especially useful as monolithic architectural spandrels and in the production of laminated viewing closures for automobiles (e.g., safety glass windshields), airplanes, trains, buildings and other vehicles and compartments having glass closures ranging in light transmission properties from transparent to translucent to opaque.

Moreover, thin glass articles treated in accordance with the present invention not only possess high surface strength but also are surprisingly flexible. For example, soda-lithia-$P_2O_5$-alumina-silica glass articles 0.090 inch thick when treated in accordance with the procedure of Example 1 are sufficiently flexible to be bent repeatedly around a circle having a 30-inch radius without fracturing the glass.

Regardless of the degree of center tension imparted to the glass articles according to the treating procedures of this invention, the central interior tensile stress zone (center tension zone), which represents the majority of the thickness of the glass, contains lithium and sodium substantially in the concentration characteristic of the given base soda-lithia-$P_2O_5$-alumina-silica glass composition subjected to treatment. After the strengthening exchange procedure is conducted in accordance with this invention, the lithium content of the strengthened surface zone is less than that of base glass and the surface zone contains a concentration of an alkali metal of larger atomic diameter than lithium, e.g., sodium, potassium, rubidium, cesium which concentration exceeds that of the same alkali metal in the base glass composition.

The imposition of high surface compressive stresses and load strength for substantial depth, as attainable in accordance with this invention, cannot be secured by alkali metal exchange treatment of ordinary glass compositions, for example, conventional soda-lime-silica glasses.

In order to achieve the benefits of this invention, it is necessary to employ as a base glass, a glass composition formed chiefly from lithia, soda and/or potassia, $P_2O_5$, alumina and silica. The base glass composition must contain $Li_2O$, either $Na_2O$ or $K_2O$ (or a combination of $Na_2O$ and $K_2O$), $P_2O_5$, $Al_2O_3$ and $SiO_2$. Moreover, each of these components should be present within fairly well defined ranges of concentration to achieve the full measure of the benefits provided by this invention. Varying amounts of additional glass modifying materials, e.g., MgO, $B_2O_3$, $ZrO_2$ and ZnO can be included.

A representative range of compositions for the soda (and/or potassia)-lithia-$P_2O_5$-alumina-silica base glass compositions in which the respective element content is determined as their respective oxides is as follows.

| Component: | Percent by wt. |
| --- | --- |
| $Li_2O$ | 2 to 15 |
| $Na_2O$ and/or $K_2O$ | 2 to 20 |
| $P_2O_5$ | 1 to 25 |
| $Al_2O_3$ | 10 to 35 |
| $SiO_2$ | 30 to 65 |
| ZnO | 0 to 12 |
| MgO | 0 to 8 |
| $B_2O_3$ | 0 to 10 |
| $ZrO_2$ | 0 to 8 |

Usually the base glass composition will contain a minimum of 3 percent by weight $Li_2O$ and 4 percent by weight $Na_2O$ and/or $K_2O$. The combined weight concentration of $Li_2O$ and $Na_2O$ and/or $K_2O$ should be at least 7 percent based on the total glass composition, and preferably the minimum combined weight concentrations of $Li_2O$ and $Na_2O$ and/or $K_2O$ is at least 7.5 percent by weight.

Moreover, in accordance with this invention, $P_2O_5$ must be present. Usually the base glass will contain at least 2.5 percent by weight $P_2O_5$, and the concentration of $P_2O_5$ should not be lower than about 1 percent by weight. Consistently superior glass articles can be produced in accordance with this invention when the concentration of $P_2O_5$ in the base glass ranges from about 2.5 to 16 percent by weight, and more preferably from about 2.5 to 12 percent by weight.

The base glass compositions contain $Al_2O_3$ in amounts ranging from about 10 to 35 percent by weight. Usually, however, the base glasses contain from about 15 to 26 percent by weight $Al_2O_3$.

$SiO_2$ is the principal glass forming oxide of the base glass and is present in a concentration ranging from about 30 to 65 percent by weight. Usually the weight concentration of $SiO_2$ ranges from about 40 to 60 percent, and more preferably from about 48 to 58 percent.

When $K_2O$ is not present, $Na_2O$ and $Li_2O$ can be present in equal weight concentrations or either $Na_2O$ or $Li_2O$ can predominate on a weight basis. Ususally, however, the weight concentration of $Na_2O$ exceeds that of $Li_2O$. Generally, $Li_2O$ predominates $Na_2O$ on a molar bases, but this is not mandatory. Accordingly, the mole ratio of $Li_2O$ to $Na_2O$ can range from 0.21 to 15.6 to 1.0 and the weight ratio of $Li_2O$ to $Na_2O$ can range from 0.1 to 7.5 to 1.0.

When $K_2O$ replaces all of the $Na_2O$, $K_2O$ and $Li_2O$ can be present in equal weight concentrations, or either $K_2O$ or $Li_2O$ can predominate on a weight basis. Usually, however, the weight concentration of $K_2O$ exceeds that of $Li_2O$. Generally $Li_2O$ predominates on a molar basis, but this is not mandatory. Accordingly, the mole ratio of $Li_2O$ to $K_2O$ can range from 0.31 to 23.0 to 1, and the weight ratio of $Li_2O$ to $K_2O$ can range from 0.1 to 7.5 to 1.

When $K_2O$ replaces a portion of the $Na_2O$, the sum of $Na_2O$ and $K_2O$ can be equal to or greater than the amount of $Li_2O$ on a weight basis, or $Li_2O$ can predominate the sum of $Na_2O$ plus $K_2O$. When all three alkali metal oxides $Li_2O$, $Na_2O$ and $K_2O$ are present, the weight concentration of $Na_2O$ usually exceeds that of $K_2O$.

For best results the combined concentration of $Li_2O$ and $Na_2O$ and/or $K_2O$ ranges from about 6 to 28 percent by weight, and more preferably from 7.0 to 20.0 percent by weight.

The total combined weight concentration of $Al_2O_3$ and $SiO_2$ should not exceed 90 percent by weight. Base compositions containing in excess of 90 percent by weight $Al_2O_3$ plus $SiO_2$ are difficult to melt, fine and form and also give rise to increasing costs for higher $Al_2O_3$ contents not only with respect to the base glass but also with regard to melting, fining and forming. Usually the combined total of $Al_2O_3$ and $SiO_2$ should not exceed about 85 percent by weight with the $Al_2O_3$ content not exceeding about 30 percent by weight.

As will be noted from the above table the use of ZnO and/or MgO is optional. ZnO and MgO assist in facilitating melting, fining and forming these glass compositions by lowering the high temperature viscosity level thereof. Consequently, when preparing glass compositions suitable for melting, fining and forming with the use of conventional sheet and plate glass melting tanks and sheet drawing or plate rolling apparatus, it is desirable to include ZnO and/or MgO. In this regard the use of ZnO is preferred. Usually such glasses contain from 0.1 to 12 percent by weight ZnO and more preferably from about 1.0 to about 3 percent by weight ZnO based on the total glass composition. When MgO is employed in place of zinc oxide, the concentration of MgO usually does not exceed 8 percent by weight and preferably does not exceed 4 percent by weight of the total glass composition. When ZnO and MgO are both used, their combined concentration should not exceed 15 percent by weight and preferably not exceed 10 percent by weight of the total glass composition. When both ZnO and MgO are present, it is preferred to use more ZnO than MgO on a weight basis.

Certain desirable properties can be attained by incorporating $B_2O_3$ and $ZrO_2$ in these glass compositions. $B_2O_3$ assists in the melting, fining and forming of the glass by lowering the high temperature viscosity characteristics of the glass. These glass compositions may contain from 0.0 to about 10.0 percent by weight $B_2O_3$. If $B_2O_3$ is used, however, the preferably amount should be from 1.0 to 7.0 percent by weight. $ZrO_2$ additions have been found to increase the depth of ion exchange penetration, to reduce the tendency for these compositions to undergo phase separation and to increase the acid durability of these glass compositions. These glass compositions may contain from 0.0 to 8.0 percent by weight $ZrO_2$. If $ZrO_2$ is used, however, the preferable range of $ZrO_2$ content is from 1.0 to 5.0 percent by weight.

$TiO_2$ can be present in amounts not usually exceeding 6 percent by weight, e.g., from 0 to 5 percent by weight, to lower the high temperature viscosity level of the base glasses. $TiO_2$, e.g., in amounts of 2 to 4 percent can be employed to adjust liquidus temperature.

Other additional oxides which may be employed in minor amounts not usually exceeding 2 percent by weight for any one of these oxides are: CaO, BaO, SrO and PbO. Small amounts, e.g., 0.0 to 0.5 percent by weight of coloring materials such as $Fe_2O_3$, CoO, NiO and Se can also be incorporated into the base glass compositions to impart color and/or heat absorbing properties thereto.

In addition these base glass compositions can contain such materials as $Sb_2O_5$, $As_2O_5$, $Na_2SO_4$, NaCl and F usually in amounts ranging from 0 to 1 percent by weight.

The weight concentration of the optional (non-essential) ingredients should not exceed 20 percent by weight and preferably not exceed 15 percent by weight of the total glass composition. The term "optional ingredients" as used herein is intended to include ZnO, MgO, $TiO_2$, CaO, BaO, $B_2O_3$, $ZrO_2$, SrO, PbO, $Fe_2O_3$, CoO, NiO, Se, $Sb_2O_5$, $As_2O_5$, $Na_2SO_4$, NaCl, F and other glass modifiers, colorants, etc.

In this regard, additional glass modifiers or other optional ingredients and materials should be avoided, which either: (1) substantially reduce the rate and depth of exchange of the larger atomic diameter alkali metal, (2) reduce the magnitude of surface compressive stress and load strength attainable by the strengthening treatment, or (3) make the base glass compositions difficult to melt, fine and/or form.

Moreover, the use of the above listed essential components, viz., $Li_2O$, $Na_2O$ and/or $K_2O$, $P_2O_5$, $Al_2O_3$ and $SiO_2$, in concentrations which vary significantly from the above indicated representative ranges should be avoided as such variations can curtail surface compressive stress and load strength, depth of strengthening and durability imparted by the strengthening treatments contemplated herein, and rapidity of treatment, while substantially increasing the cost of strengthening.

The alkali metal exchange strengthening treatments herein contemplated are achieved by contacting the surface of the base glass with an alkali metal salt having an atomic diameter larger than lithium at an elevated temperature and for a period of time long enough to obtain a substantial exchange of the larger atomic diameter alkali metal for lithium, and other exchangeable alkali or other metals in the base glass having atomic diameters smaller than the alkali metal employed for strengthening.

The alkali metal strengthening treatment is conducted at temperatures below the strain point of the base glass, viz., usually below about 1100° F. for a sufficient period of time to replace to a marked extent the lithium and other available smaller atomic diameter metal or metals by the larger atomic diameter alkali metal or metals of the treating salt.

The length of the treatment period depends upon several factors including among others, the specific composition of the base glass, the relative rate of exchange of a given larger atomic diameter alkali metal, and the specific treatment temperature. The treatment period can range from short contact periods of about 1 minute up to a period of several hours. However, for treatment temperatures in excess of 600° F. and ranging from about 700° F. to 1100° F., contact periods of 5 to 60 minutes are usually sufficient. In fact when the higher treatment temperatures are used, viz., 900° F. to 1080° F. the base glass compositions can be provided with greatly enhanced surface compressive stress and load strength by treatment times ranging from about 2 to 40 minutes. Longer periods of contact are not objectionable to attain a given set of objectives so long as the surface compressive stress and load strength induced by the alkali metal strengthening treatment is substantially retained over the entire treatment period at the treatment temperatures employed.

The result of the larger atomic diameter alkali metal strengthening treatment is to deplete the lithium content on the surface and thereby generate a surface which is in compression for a deep penetration and is rich in the larger atomic diameter alkali metal, e.g., sodium, potassium, cesium and rubidium, of the alkali metal treating salt employed for strengthening. When sodium is employed as the larger atomic diameter alkali metal, the penetration of sodium into the surface of the treated glass usually takes place to a depth of about 50 to 250 microns, and even deeper.

The sodium and potassium alkali metal salts cause the imposition of enhanced surface compressive stress for greater depth than obtainable when using cesium or rubidium salts. Also as between sodium, potassium, cesium and rubidium alkali metal strengthening salts, sodium and potassium alkali metal strengthening salts, sodium and potassium alkali metal salts are more readily available and hence less expensive. As between sodium and potassium alkali metal salts, the use of sodium salts is preferred since sodium is capable of imposing high compressive stress into the glass surface to a far greater depth than securable by the use of potassium salts. However, potassium salts possess an advantage over sodium salts in that a slightly higher magnitude of surface compressive stress and load strength is attainable even though lesser penetration depths are secured.

The following description and examples are directed to alkali metal exchange strengthening of $$Li_2O-Na_2O-P_2O_5-Al_2O_3-SiO_2$$

glasses, but it should be realized that $K_2O$ can be substituted for part or all of the $Na_2O$ in the base glass compositions as noted hereinabove.

The alkali metal salt strengthening treatment is conducted conveniently by immersing the soda-lithia-$P_2O_5$-alumina-silica base glass into a molten bath of the larger atomic diameter alkali metal strengthening salt for a sufficient period of time to secure the desired exchange and penetration of the larger atomic diameter alkali metal into the surface of the base glass. To effect this treatment the alkali metal strengthening salt is placed in any suitable container, e.g., a stainless steel tank or other inert receptacle, and heated to a temperature at which it is molten. Usually the temperature of treatment will vary between the threshold temperature at which the alkali metal treating salt becomes molten and the strain point of the base glass being strengthened, and any convenient treating temperature between the melting point of the alkali metal strengthening salt and the glass strain point can be used.

Prior to immersion of the base glass into the molten alkali metal salt treating bath, the base glass article is preferably preheated to a temperature within a range of 50° F. above or below the temperature at which the alkali metal exchange treatment is to be conducted, viz, the temperature at which the alkali metal salt is maintained during treatment. More preferably, the glass article is preheated to a temperature fairly closely approximating that at which the exchange strengthening treatment is conducted.

In a typical method of performing this invention, the preheated soda-lithia-$P_2O_5$-alumina-silica base glass, for example, in plate or sheet form, is dipped into a molten bath of sodium nitrate maintained at a temperature of 700° F. to 1100° F. and treated for a period of about 2 to about 60 minutes. This strengthening treatment causes introduction of sodium into the surface of the base glass by replacement of sodium for the lithium and other exchangeable smaller atomic diameter metals or other electropositive elements in the surface of the base glass at the time of treatment thereby developing high surface compressive stress and load strength in the glass and depleting the lithium content at the surface.

The thus treated glass article is then removed from the molten sodium nitrate treating bath and cooled gradually to a temperature roughly approximating room temperature, viz, a temperature ranging from 200° F. down to and even below room temperature. Following cooling, the glass is usually subjected to aqueous rinsing to remove excess treating salt.

Instead of a sodium treating salt, a molten potassium salt, e.g., potassium nitrate, can be employed for strengthening the base glass. In such a case, the potassium from the potassium treating salt exchanges for the lithium and sodium, each being a smaller atomic diameter alkali metal than potassium, thereby incorporating potassium into the surface of the base glass to produce potassium exchange strengthened glass.

The alkali metal salts used for strengthening treatment should be fairly stable at the treatment temperatures employed. Typically satisfactory salts are those of mineral acids, such as the sulfates, nitrates, chlorides, fluorides and phosphates of sodium, potassium, cesium and rubidium and the like salts which are low in alkalinity and do not seriously deface or etch the base glass article.

The foregoing discussion has related to employing a single larger atomic diameter alkali metal exchange strengthening treatment, and for most purposes a single exchange treatment is wholly satisfactory to secure the desired results. However, it is also within the purview of this invention to strengthen the soda-lithia-$P_2O_5$-alumina-silica base glass by subjecting it to a series of alkali metal salt exchange treatments. In such serially conducted treatments, each successive treatment is conducted using an alkali metal salt having a larger atomic diameter than the alkali metal employed for a prior exchange strengthening treatment. Such successive later exchange treatment or treatments, all of which are preferably conducted at temperatures below the glass strain point can serve to increase the magnitude of surface compressive stress and even thickness of the surface compressive stress zone.

For example, the base glass can be subjected first to sodium exchange strengthening treatment, using molten sodium nitrate treating salt, followed by a further alkali metal strengthening treatment using a molten salt of an alkali metal having an atomic diameter larger than sodium, e.g., a molten potassium salt, such as molten potassium nitrate. The effect of the second alkali metal strengthening treatment is to deplete the sodium and other available exchangeable lower atomic diameter alkali metals at the surface of the glass, thus replacing them with potassium. By this means the magnitude of the compressive stress at the surface of the glass and hence its load strength can be increased. Moreover, if desired, the sodium-potassum exchange strengthened glass can be subjected to further successive alkali metal exchange treatments using first rubidium and then cesium salts, respectively.

Usually when strengthening the base glass compositions by the use of such successive alkali metal salt exchange strengthening treatments, the glass is cooled between each exchange treatment to a temperature ranging from 200° F. down to and even below room temperature. Following cooling, the glass is usually subjected to aqueous rinsing or to other cleansing prior to subsequent exchange treatments to remove excess treating salt. The glass is then preheated prior to a subsequent exchange treatment or treatments.

However, it is also within the purview of this invention to avoid the loss of time and thermal energy required in (1) cooling the glass to room temperature between exchange treatments, and (2) then preheating the glass to temperatures approximating those at which the subsequent exchange treatment or treatments are to be conducted, by cleansing the glass without first cooling to room temperature by impinging or flowing preheated air or other inert gases (which have been preheated to the treatment temperatures to be employed in the subsequent exchange treatment) upon the surface of the thus treated glass, thereby serving to remove excess molten treating salt. Instead of gases, absorbing clays or silica powders can be employed for high temperature cleansing, and these materials can serve to absorb excess molten salt.

While the various above-mentioned exchange strengthening treatments can be conducted effectively by immersion of the base glass in a molten bath of the larger atomic diameter alkali metal salt, other methods of contact can be used. Thus, for example, the base glass can be sprayed or otherwise provided with an adherent coating of the sodium salt, and the thus coated glass can be heated to a temperature at which the sodium salt is molten to effect a non-immersion exchange strengthening.

Furthermore, the alkali metal treating salt can be mixed with a coherent, inert carrier or diluent, e.g., thixothropic clay to form a paste which is adherent to the glass, and the paste then applied to the glass prior to, simultaneously with, or even shortly after heating the glass to treatment temperatures. The paste should usually contain from 15 to 80 percent by weight alkali metal salt to achieve non-immersion exchange strengthening within reasonably rapid treatment periods.

The term "atomic diameter" as used herein means the "crystal angstroms" atomic diameter as expressed in kilo-X, viz, "kX" units. These "kX" units are smaller than "absolute angstroms" and "kX"=A./1.0020. The term "atomic diameter" as used herein denotes the "kX" as reported on pages 20–23 (column 4) of the booklet "Key to the Welch Periodic Chart of the Atoms" (1959) by William F. Meggers. The atomic diameter values in said booklet were mainly taken from "The Structure of Metals and Alloys" by William Hume-Rothery, the Institute of Metals, London, 1945.

As mentioned hereinabove the essential components of the base glass compositions are $Li_2O$, $Na_2O$, (and/or $K_2O$), $P_2O_5$, $Al_2O_3$ and $SiO_2$, which should be present in the above tabulated ranges in order to obtain the full measure of benefits attainable with this invention. Within this family of lithia-soda-$P_2O_5$-alumina-silica glasses, the proportion of the essential components can be varied to tailor-make the base glass composition, e.g., to satisfy a particular process requirement or impart a desired physical and/or chemical property or properties thereto. Hence, the present invention possesses the added advantages of procedural and property flexibility in the comparatively infant field of glass strengthening by chemical exchange treatment.

For example, if the primary requisites are for a high-speed strengthening process wherein the desired center tension stress level is arrived at in minimal time periods yielding strengthened glass products capable of maintaining their strength when exposed to fairly high temperatures, then the above-mentioned ingredients would be present in the following weight percentage ranges: $SiO_2$ at least 50 percent and preferably from 51 to 56 percent; $Na_2O$, from 3.5 to 7.5 percent; $Li_2O$, from 4 to 7 percent; $Al_2O_3$, from 25 to 27 percent and $P_2O_5$, from 8 to 11 percent. Two exemplary fast exchanging glass compositions A and B are listed hereinbelow. The weight percents are calculated from batch materials.

| Component | Weight Percent | |
|---|---|---|
| | A | B |
| $SiO_2$ | 54.38 | 51.38 |
| $Al_2O_3$ | 26.61 | 26.61 |
| $Li_2O$ | 5.04 | 5.04 |
| $Na_2O$ | 4.00 | 7.00 |
| $P_2O_5$ | 9.96 | 9.96 |

It has been discovered that the incorporation of $P_2O_5$ greatly enhances ion exchange by allowing ion exchange to proceed far more rapidly than attainable prior to this invention and causing rapid center tension buildup and deep penetrations for the strengthening treatment. This discovery of the advantageous effect of $P_2O_5$ especially in combination with $Na_2O$ in enhancing ion exchange is surprising since prior to this invention it was believed that the incorporation of all other glass forming ions in $Li_2O$-$Al_2O_3$-$SiO_2$ glasses lowered penetration depth and rate of ion exchange and consequently caused a decrease in the buildup of center tension stress. When $Na_2O$ and/or $P_2O_5$ are removed from the base glass, ion exchange rate and center tension buildup fall off markedly.

According to another aspect of this invention where depth of ion exchange penetration is a prime factor, the $Na_2O$-$P_2O_5$ containing glass compositions would be chosen from compositions containing the five essential components in the following weight percentages: $SiO_2$, between 43 and 56 percent; $Al_2O_3$, from 25 to 27 percent; $Li_2O$, from 4 to 7 percent; $NaO_2$, from 3.5 to 12 percent; $P_2O_5$, from 8 to 12 percent and ZnO, 0 to 5 percent. In addition to glass compositions A and B above two additional exemplary glass compositions C and D are listed below can be cited as typical for attaining deep penetrations of the sodium ion exchange treatment.

| Component | Calculated Weight Percent | |
|---|---|---|
| | C | D |
| $SiO_2$ | 44.38 | 47.38 |
| $Al_2O_3$ | 26.61 | 26.61 |
| $Li_2O$ | 5.04 | 5.04 |
| $Na_2O$ | 11.00 | 11.00 |
| $P_2O_5$ | 9.96 | 9.96 |
| ZnO | 3.00 | |

This invention will be illustrated in greater detail by the examples which follow. However, it should be realized that the invention in its broadest aspects is not necessarily limited to the particular exchange salt materials, temperatures, treatment times and other conditions set forth below in the examples.

*Example 1*

The base glass compositions A, B, C and D subjected to treatment are lithia-soda-$P_2O_5$-alumina-silica glasses which have the following calculated compositions based upon batch composition mixed prior to melting, fining and forming (the metal components thereof being expressed as their oxides):

TABLE OF GLASS COMPOSITIONS (PERCENT BY WEIGHT)

| Component | Glass A | Glass B | Glass C | Glass D |
|---|---|---|---|---|
| $SiO_2$ | 54.38 | 51.38 | 44.38 | 47.38 |
| $Al_2O_3$ | 26.61 | 26.61 | 26.61 | 26.61 |
| $Li_2O$ | 5.04 | 5.04 | 5.04 | 5.04 |
| $Na_2O$ | 4.00 | 7.00 | 11.00 | 11.00 |
| $P_2O_5$ | 9.96 | 9.96 | 9.96 | 9.96 |
| ZnO | | | 3.00 | |
| Liquidus temperature (° F.) | 2,230–2,255 | 2,095–2,115 | 1,810–1,835 | 1,840–1,860 |

The above glasses are prepared by mixing respectively batches A, B, C and D given in respective parts by weight below (the parts by weight given yield 100 parts by weight of base glass (one pound) having the above calculated compositions upon melting and fining):

| Batch Ingredient | Parts by Weight | | | |
|---|---|---|---|---|
| | Batch A | Batch B | Batch C | Batch D |
| Agate Sand ($SiO_2$) | 54.38 | 57.38 | 44.38 | 47.38 |
| Hydrated Aluminum Hydroxide ($Al(OH)_3 \cdot H_2O$) | 37.45 | 37.45 | 37.45 | 37.45 |
| $Li_2CO_3$ | 12.56 | 12.56 | 12.56 | 12.56 |
| $NaCO_3$ | 6.87 | 12.02 | 18.89 | 18.89 |
| $Al(PO_3)_3$ | 12.73 | 12.73 | 12.73 | 12.73 |
| ZnO | | | 3.00 | |
| Melting Temperature (° F.) | 2,750 | 2,700–2,750 | 2,700 | 2,700–2,750 |
| Melting Time (hours) | 20–24 | 20–24 | 20–24 | 20–24 |

The batch ingredients are thoroughly mixed and placed in a suitable melting receptacle, e.g., a high temperature resistant clay or platinum container, and subjected to temperatures of 2700° F. to 2750° F. for a period of 20 to 24 hours depending upon their respective viscosity level to melt and fine the batch. The expression "melting time" as used herein refers to the total time period employed to melt and fine the batch materials. The batch materials are melted, quenched in water and remelted following this sequence repeatedly in order to prepare uniform base glass compositions. The glasses are melted in clay crucibles and thereafter fined in platinum crucibles. After fining, the glass is cast onto a suitable casting surface, e.g., graphite or cold rolled steel, to form plates. Then these plates are placed in an annealing oven and annealed from a temperature slightly above the annealing point, viz, 1050° F. to 1200° F. by gradually lowering the temperature at a rate of 1° F. per minute for the first three to four hours of annealing through the annealing range to a temperature below the glass strain point, viz, 870° F. to 960° F. The glass is then further cooled gradually down to room temperature at a cooling range slow enough to avoid thermal shock and breakage, e.g., from 5° to 20° F. per minute. The thus annealed plates are then ground and polished in conventional fashion to the desired thickness.

Polished flat glass test plates approximately one inch long and varying in width from ¼ to ½ inch and having thicknesses as noted hereinbelow in Table I, are preheated to a temperature of 900° F. plus or minus 15° F. in an insulated oven over a period of approximately 15 minutes.

Then the preheated plates are directly immersed into a molten sodium nitrate salt bath at the temperatures and treatment times noted below in Table 1. Prior to immersion of the test plates, the sodium nitrate salt is placed in a suitable container, e.g., a stainless steel beaker, and heated to the treatment temperatures. The test plates are completely immersed in molten sodium nitrate through the treatment period.

At the end of the treatment period, the test plates are removed from the molten sodium nitrate treating bath and cooled in air to room temperature. Then the sodium exchange treated plates are rinsed with water to remove excess treating salt and dried.

These sodium exchange treated plates are optically measured for stress magnitude and thickness of the surface compressive stress zone as well as magnitude of center tension (central interior tensile stress). Eight-inch by one-inch test plates are used in testing for load strength. The appropriate results are listed below in Table 1.

The optical stresses, both compressive stress and tensile stress, are measured by birefringence using a graduated quartz wedge (prism) calibrated in millimicrons. The test plates are mounted on the stage of a petrographic microscope (one containing the polarizing element built into the optical system below the stage surface) equipped with the quartz wedge. Index matching fluid, viz, oil having the same index of refraction as the glass plate, is placed on the underside of the glass surface. The glass test plate specimen is then mounted on a microscope slide so that either major surface (upper or lower) of the test plate is parallel to the upper surface of the slide. The zone of the sample to be measured is selected and the optical retardation and depth of that zone is measured by viewing through that zone. The appropriate optical retardation in millimicrons is obtained by reading it from the calibrated quartz wedge. The appropriate depth at which a given optical retardation exists in a given zone is obtained by means of an eyepiece calibrated in microns. Since the test plates are less than one inch thick, the measured values of retardation are converted by multiplying by the appropriate factor to express the stress in terms of millimicrons per inch.

Then the optical rating of stress in millimicrons per inch is converted to mechanical pounds per square inch stress units according to either Equation 1 or 2:

$$E = \frac{N_1 - N_2}{C}$$

(Equation 1)

wherein $N_1$ is the index of refraction of the sample for light polarized parallel to the surface.

$N_2$ is the index of refraction of the sample for light polarized perpendicular to the surface.

C is the photoelastic constant of the glass being measured, and E is the mechanical stress in pounds per square inch.

Since $N_1 - N_2 = R/t$, where R is the observed retardation and $t$ is the path length through which the polarized light passes in the sample section, viz, the thickness of the sample section, Equation 1 can also be written as Equation 2 which is obtained by substituting $R/t$ for $N_1 - N_2$ in Equation 1, $$E = \frac{R}{(t) \cdot (c)}$$

(Equation 2)

When using Equation 2, both R and $t$ are expressed in the same units whether in terms of millimicrons or inches.

The load strength tests are conducted using four point loading on test samples 8 inches long by one inch wide and having a nominal ⅒ inch thickness. The sample is placed on top of the lower support edges, which are spaced approximately one inch from the edge of the 8-inch dimension. Two upper support edges spaced 2 inches apart are placed on top of the sample, each being 3 inches from the edge of the 8-inch dimension. A metal plate is then rested on the upper support edges and the load is applied to the center of the metal plate. The effective loading span is 4 inches and the rate of loading is 0.2 inch per minute, and the load strength is the average load strength (pounds per square inch) at which failure (glass breakage) occurs for the tested samples, all sample plates of a given group being identically treated for strengthening. This load strength in pounds per square inch (S) is arrived at according to the equation:

$$S = \frac{3Wl}{2bt^2}$$

where
$W$ = load weight at failure (pounds)
$l$ = effective loading span (inches)
$b$ = width of test sample (inches)
$t$ = thickness of test sample (inches)

a circular area of approximately 0.45 square inches (diameter of abraded circle = 0.750 inch) for an instantaneous abrasion until the 2 cubic centimeters of $Al_2O_3$ contact the glass.

The Group 1 samples were exchange treated with sodium nitrate at 850° F. for 16 minutes. The Group 2 samples were exchange treated with sodium nitrate at 850° F. for 36 minutes, and the Group 3 samples were exchange treated with sodium nitrate at 900° F. for 36 minutes.

TABLE 1

| Group | Base Glass Composition | Glass Thickness (inches) | Treatment Temperature (° F.) | Treatment Times (minutes) | Optical Center Tension (optical retardation at central region in millimicrons per inch) | Surface Compressive Stress Zone Depth (microns) | Maximum Optical Surface Compressive Stress (pounds per inch²) |
|---|---|---|---|---|---|---|---|
| 1 | A | 0.250 | 900 | 16 | N.D. | 175 | 56,000 |
| 2 | A | 0.250 | 950 | 16 | N.D. | 230 | 54,000 |
| 3 | A | 0.085 | 950 | 16 | 3,340 | N.D. | N.D. |
| 4 | A | 0.085 | 1,000 | 16 | 4,270 | N.D. | N.D. |
| 5 | A | 0.085 | 1,050 | 16 | 4,725 | N.D. | N.D. |
| 6 | B | 0.085 | 900 | 16 | 2,515 | N.D. | N.D. |
| 7 | B | 0.250 | 900 | 16 | N.D. | 220 | 45,000 |
| 8 | B | 0.085 | 950 | 16 | 3,040 | N.D. | N.D. |
| 9 | B | 0.250 | 950 | 16 | N.D. | 270 | 43,000 |
| 10 | B | 0.085 | 950 | 36 | 4,385 | N.D. | N.D. |
| 11 | C | 0.085 | 850 | 16 | 1,705 | N.D. | N.D. |
| 12 | C | 0.250 | 850 | 16 | 1,705 | N.D. | N.D. |
| 13 | C | 0.085 | 900 | 16 | 2,110 | N.D. | N.D. |
| 14 | C | 0.250 | 900 | 16 | N.D. | 200 | 42,000 |
| 15 | C | 0.085 | 900 | 36 | 2,800 | N.D. | N.D. |
| 16 | C | 0.250 | 950 | 16 | N.D. | 235 | 37,000 |
| 17 | C | 0.085 | 950 | 16 | 2,370 | N.D. | N.D. |
| 18 | D | 0.085 | 900 | 16 | 2,435 | N.D. | N.D. |
| 19 | D | 0.250 | 900 | 16 | N.D. | 220 | 39,000 |
| 20 | D | 0.085 | 900 | 36 | 3,380 | N.D. | N.D. |
| 21 | D | 0.085 | 950 | 16 | N.D. | 270 | 39,000 |
| 22 | D | 0.085 | 950 | 36 | 3,530 | N.D. | N.D. |

N.D.—Not determined.

Eight-inch by approximately one-inch test plate samples of Glass Composition C having the thicknesses noted in Table 2 below were prepared and sodium exchange treated by immersion in molten sodium nitrate following the procedures noted above for the respective time periods and at the temperatures noted below in Table 2. These samples were then load strength tested as noted above. One set of load strength determinations was made prior to abrasion, the other thereafter.

The abrasion was conducted after exchange treatment but before load testing by impinging 2 cubic centimeters of 100 grit $Al_2O_3$ at an air blast pressure of 30 pounds per square inch (gauge) from a 0.750 inch metal tube positioned flush with the upper surface of the test sample. The geometric center of the sample was abraded over The letter U refers to unabraded samples, whereas A refers to abraded samples.

The average unabraded and abraded load break strength of Glass Composition C test plates 8 inches long by 1 inch wide by approximately 0.103 inches thick but not subjected to sodium exchange strengthening treatment is as follows:

Unabraded = pounds per square inch,
Abraded = pounds per square inch.

TABLE 2

| Group and Sample No. | Center Tension (millimicrons per inch) | Width (inches) | Thickness (inches) | Load Weight (pounds) | Load break Strength at Failure (pounds per square inch) |
|---|---|---|---|---|---|
| 1-1-U | 1,415 | 1.030 | 0.1030 | 107.5 | 59,010 |
| 1-2-U | 1,410 | 1.030 | 0.1030 | 79.9 | 43,860 |
| 1-(Average U) | 1,415 | 1.030 | 0.1030 | 93.7 | 51,435 |
| 1-3-A | 1,430 | 1.030 | 0.1030 | 66.1 | 36,285 |
| 1-4-A | 1,440 | 1.030 | 0.1030 | 59.0 | 32,390 |
| 1-5-A | 1,440 | 1.035 | 0.1032 | 56.3 | 30,645 |
| 1-6-A | 1,435 | 1.035 | 0.1033 | 58.0 | 31,515 |
| 1-7-A | 1,435 | 1.033 | 0.1032 | 58.7 | 32,015 |
| 1-(Average A) | 1,435 | 1.032 | 0.1031 | 59.6 | 32,800 |
| 2-1-U | 2,035 | 1.030 | 0.1030 | 102.1 | 56,050 |
| 2-2-U | 2,010 | 1.035 | 0.1030 | 100.2 | 54,750 |
| 2-(Average U) | 2,020 | 1.032 | 0.1030 | 101.15 | 55,400 |
| 2-3-A | 2,025 | 1.025 | 0.1035 | 63.2 | 34,535 |
| 2-4-A | 2,020 | 1.030 | 0.1030 | 67.4 | 37,000 |
| 2-5-A | 2,010 | 1.030 | 0.1031 | 68.0 | 37,260 |
| 2-6-A | 2,035 | 1.040 | 0.1031 | 71.4 | 38,750 |
| 2-(Average A) | 2,020 | 1.031 | 0.1032 | 67.5 | 36,885 |
| 3-1-U | 2,460 | 1.025 | 0.1028 | 92.2 | 51,070 |
| 3-2-U | 2,460 | 1.020 | 0.1029 | 94.1 | 52,280 |
| 3-(Average U) | 2,460 | 1.023 | 0.1029 | 93.15 | 51,675 |
| 3-3-A | 2,445 | 1.030 | 0.1030 | 65.6 | 36,010 |
| 3-4-A | 2,415 | 1.033 | 0.1030 | 76.6 | 41,935 |
| 3-5-A | 2,375 | 1.010 | 0.1031 | 66.0 | 36,885 |
| 3-6-A | 2,435 | 1.025 | 0.1031 | 70.6 | 38,880 |
| 3-(Average A) | 2,420 | 1.025 | 0.1030 | 69.7 | 38,430 |

As noted from Tables 1 and 2 above, optical surface compressive stresses ranging from approximately 37,000 to 56,000 pounds per square inch are observed.

The unabraded load strength values of a typical $Li_2O$-$Na_2O$-$P_2O_5$-$Al_2O_3$-$SiO_2$ glass strengthened in accordance with this invention, viz., Glass Composition C, range from approximately 43,000 to 59,000 pounds per square inch from the 16 minutes sodium exchange treatment. Moreover, as noted from Table 1, center tension stress levels exceeding about 4,700 millimicrons per inch, viz., 10,600 pounds per square inch tensile stress, can be readily achieved in short time periods with this invention. This is a commercially important feature as regards achieving strength plus small particle break pattern in short treatment periods.

Hence, this invention provides a rapid exchange strengthening treatment of highly beneficial nature yielding both very high surface strength (surface compressive stress and load strength) and substantial durability against abrasion due to deep surface zones of strength. Moreover, as will be noted from the above table, this unusual and highly beneficial combination of properties can be imparted to glass articles which are quite thin, thus substantially widening the scope of utility of thin glass particles due to the improvements in strength, durability and break pattern safety attainable within the purview of this invention. If either $P_2O_5$ or $Na_2O$ (or $K_2O$) is omitted, ion exchange rate, center tension build-up, and sodium exchange penetration depth suffer markedly.

For example, when a lithia-alumina-magnesia-silica glass composition containing neither $P_2O_5$ nor $Na_2O$ (Group W) is sodium exchange treated by immersion in molten sodium nitrate at the temperatures and for the time periods noted in Table 3 below; ion exchange rate, center tension build-up, and sodium exchange penetration depth suffer markedly. The group W glass contains 5.63 percent by weight $Li_2O$, 4.11 percent by weight MgO, 29.66 percent by weight $Al_2O_3$, and 60.61 percent by weight $SiO_2$ (as calculated from batch).

The effect of adding $P_2O_5$ to the Group W glass is shown in Group X of Table 3 where the Group X base glass was prepared by adding 10 percent by weight $P_2O_5$ to the Group W glass.

The advantageous effects of providing a base glass containing both $P_2O_5$ and $Na_2O$ are shown in Group Y in Table 3. The base glass of Group Y is Composition A as shown in the Table of Glass Compositions for Example 1.

For the sake of convenience the center tension values were determined on 0.085 inch thick samples, and the surface compressive stress zone depth values were determined using 0.250 inch thick samples in the same manner as Table 1.

TABLE 3

| Group | Base Glass Composition (weight percent) | Sample Thickness (inches) | Treatment Temperature (° F.) | Treatment Time (minutes) | Center Tension (millimicrons per inch) | Surface Compressive Stress Zone Depth (microns) |
|---|---|---|---|---|---|---|
| W | W | 0.085 | 900 | 16 | 1,265 | |
| W | $Li_2O = 5.63$ | 0.085 | 950 | 16 | 1,765 | |
| W | MgO = 4.11 | 0.250 | 900 | 16 | | 55 |
| W | $Al_2O_3 = 29.66$ | 0.250 | 950 | 16 | | 68 |
| W | $SiO_2 = 60.61$ | | | | | |
| X | W | 0.085 | 900 | 16 | 1,405 | |
| X | | 0.085 | 950 | 16 | 1,820 | |
| X | plus 10 percent by weight $P_2O_5$ | 0.250 | 900 | 16 | | 85 |
| X | | 0.250 | 950 | 16 | | 110 |
| Y | A | 0.085 | 900 | 16 | 2,585 | |
| Y | | 0.085 | 950 | 16 | 3,330 | |
| Y | As shown above in the Glass Composition Table | 0.250 | 900 | 16 | | 170 |
| Y | | 0.250 | 950 | 16 | | 230 |

From the foregoing tests and similar experiments, it is concluded that both $P_2O_5$ and $Na_2O$ (and/or $K_2O$) are essential in the base glass composition in order to attain the benefits securable with this invention.

*Example 2*

The base glass compositions E and J subjected to treatment are lithia-soda-$P_2O_5$-alumina-silica glasses having the following calculated compositions based upon batch composition mixed prior to melting, fining and forming:

TABLE OF GLASS COMPOSITIONS (PERCENT BY WEIGHT)

| Component | Glass E | Glass F | Glass G | Glass H | Glass I | Glass J |
|---|---|---|---|---|---|---|
| $SiO_2$ | 49.46 | 43.56 | 47.46 | 45.61 | 39.76 | 42.46 |
| $Al_2O_3$ | 24.20 | 30.93 | 24.20 | 24.66 | 25.00 | 24.20 |
| $Li_2O$ | 4.59 | 5.86 | 4.59 | 5.62 | 5.00 | 4.59 |
| $Na_2O$ | 4.00 | 4.00 | 6.00 | 5.00 | 10.01 | 8.00 |
| $P_2O_5$ | 14.40 | 15.64 | 14.40 | 15.00 | 10.00 | 14.40 |
| MgO | 3.27 | | | | 4.13 | |
| ZnO | | | 3.27 | | 9.16 | 6.27 |
| $Na_2SO_4$ | | | | | 0.71 | |
| NaCl | | | | | 0.12 | |
| Liquidus Temperature | 2,130–2,155 | 2,266–2,286 | (¹) | 2,112–2,130 | (¹) | 2,075–2,095 |

¹ Not determined.

The glasses E to J having the above calculated compositions are prepared from starting batches E to J, respectively, given in parts by weight, mixed to obtain 100 weight parts (one pound) of glass upon melting and fining.

| Batch Ingredient | Parts by Weight | | | | | |
|---|---|---|---|---|---|---|
| | Batch E | Batch F | Batch G | Batch H | Batch I | Batch J |
| Agate Sand ($SiO_2$) | 49.45 | 43.56 | 47.50 | 45.60 | 39.87 | 42.49 |
| $Al(OH)_3 \cdot H_2O$ | 32.03 | 41.99 | 32.06 | 32.51 | 35.01 | 32.06 |
| $Li_2CO_3$ | 11.44 | 14.61 | 11.44 | 14.01 | 12.49 | 11.44 |
| $Na_2CO_3$ | 6.87 | 6.87 | 10.30 | 8.59 | 17.22 | 13.75 |
| $Al(PO_3)_3$ | 18.40 | 19.99 | 18.42 | 19.17 | 12.81 | 18.42 |
| MgO | 7.05 | | | 8.64 | | |
| ZnO | | | 3.27 | | 9.18 | 6.28 |
| $Na_2SO_4$ | | | | | 0.71 | |
| NaCl | | | | | 0.12 | |
| Melting Temp. (° F.) | 2,700–2,750 | 2,700 | 2,700 | 2,650–2,700 | 2,400–2,500 | 2,500–2,600 |
| Melting Time (hours) | 20–24 | 20–24 | 20–24 | 20–24 | 20–24 | 20–24 |

The batch compositions E to J are melted, fined and formed, ground and polished as in Example 1 into test plates approximately one inch long by ¼ to ½ inch wide and of the thickness shown in Table 4 below. These polished plates are preheated to treatment temperature prior to immersion in molten sodium nitrate treating bath for the immersion periods noted below in Table 4.

At the end of the treating periods, the test plates are removed from the molten bath, cooled gradually in air to room temperature as in Example 1, rinsed clean with water and dried. Then the surface compressive stress zone depth as well as the optical center tension values of certain of the thus treated test plates are determined in accordance with the procedures set forth in Example 1. These values, where determined, are shown in Table 4 below.

(and/or $K_2O$) or both $P_2O_5$ and $Na_2O$ (and/or $K_2O$) are omitted however.

Example 3

Sodium exchange strengthened test plates two inches long by two inches wide by ¼ inch thick of Compositions B, C, D, and J prepared and sodium exchange treated using molten sodium nitrate according to Examples 1 and 2 for the treatment times and treatment temperatures noted below in Table 5 were subjected to moisture-vapor attack in a temperature-humidity controlled cabinet. Companion moisture-vapor tests were also conducted on: (1) conventional soda-lime plate glass; (2) conventional soda-lime sheet glass; (3) a lithia-soda-alumina-silica glass composition containing no $P_2O_5$ but having sodium exchange strengthening treatment; (4) conventional plate

TABLE 4

| Group | Base Glass Composition | Sample Thickness (inches) | Treatment Temperature (° F.) | Treatment Time (minutes) | Optical Center Tension (millimicrons per inch) | Surface Compressive Stress Zone Depth (microns) |
|---|---|---|---|---|---|---|
| 1 | E | 0.085 | 900 | 16 | 2,145 | |
| 2 | E | 0.085 | 950 | 16 | 2,280 | |
| 3 | E | 0.085 | 950 | 36 | 3,400 | |
| 4 | E | 0.250 | 900 | 16 | | 155 |
| 5 | E | 0.250 | 950 | 16 | | 180 |
| 1 | F | 0.085 | 900 | 16 | 2,635 | |
| 2 | F | 0.250 | 900 | 16 | | 180 |
| 3 | F | 0.250 | 950 | 16 | | 205 |
| 1 | G | 0.085 | 900 | 16 | 2,040 | |
| 2 | G | 0.085 | 950 | 16 | 2,190 | |
| 3 | G | 0.250 | 900 | 16 | | 180 |
| 4 | G | 0.250 | 950 | 16 | | 200 |
| 1 | H | 0.085 | 900 | 16 | 2,240 | |
| 2 | H | 0.085 | 950 | 16 | 2,610 | |
| 3 | H | 0.250 | 900 | 16 | | 155 |
| 4 | H | 0.250 | 950 | 16 | | 195 |
| 1 | I | 0.085 | 900 | 16 | 2,265 | |
| 2 | I | 0.085 | 950 | 16 | 2,670 | |
| 3 | I | 0.250 | 900 | 16 | | 150 |
| 4 | I | 0.250 | 950 | 16 | | 210 |
| 1 | J | 0.085 | 900 | 16 | 1,930 | |
| 2 | J | 0.085 | 950 | 16 | 1,985 | |

From Examples 1 and 2 above, it will be noted that certain of the $Li_2O-Na_2O-P_2O_5-Al_2O_3-SiO_2$ base glass compositions, e.g., Compositions C and D have viscosity levels and liquidus temperature fairly closely approximating those of conventional sheet and plate glass compositions. This allows any such $$Li_2O-Na_2O-P_2O_5-Al_2O_3-SiO_2$$

glass compositions to be melted, fined and formed using conventional glass melting and forming tanks already in use to make sheet and plate glass. This is a further advantageous feature of this invention since most presently available lithia-alumina-silica ion exchangeable glass compositions have viscosity levels and liquidus temperature ranges too high to permit melting and forming such glasses by conventional sheet and plate glass melting and forming procedures.

Also, it should be noted that as long as both $P_2O_5$ and $Na_2O$ (and/or $K_2O$) are present in the requisite amounts in the base glass composition to be strengthened by alkali metal exchange treatment, small amounts of modifying oxides e.g., ZnO and/or MgO can be included therein without substantially detracting from the ion exchange rate, center tension buildup and strengthening alkali metal penetration. This is not true when either $P_2O_5$ or $Na_2O$ glass (1) having potassium exchange strengthening treatment using molten $KNO_3$ at 925° F. for a 15 to 20 minute immersion treatment, and (5) conventional sheet glass (2) having the same potassium exchange strengthening treatment as noted above in (4).

The compositions of Glass Compositions 1, 2 and 3, none of which contain $P_2O_5$ are listed hereinbelow.

| Component | Percent by Weight | | |
|---|---|---|---|
| | 1 | 2 | 3 |
| $SiO_2$ | 71.6 | 73.0 | 65.16 |
| $Al_2O_3$ | 0.2 | 1.2 | 20.82 |
| $Na_2O$ | 13.1 | 13.2 | 5.02 |
| $Li_2O$ | | | 3.99 |
| CaO | 11.7 | 8.5 | |
| MgO | 2.5 | 3.5 | 4.18 |
| $Na_2SO_4$ | 0.7 | 0.4 | |
| NaCl | 0.1 | 0.1 | |
| $Fe_2O_3$ | 0.1 | 0.1 | |
| $K_2O$ | | | 0.15 |
| $As_2O_5$ | | | 0.18 |
| $Sb_2O_5$ | | | 0.18 |

The alkali metal strengthening treatments to which samples B, C, D, J, 3, 4, and 5 were subjected prior to exposure to moisture-vapor attack is tabulated below. Samples 1 and 2 did not undergo alkali metal strengthening treatment.

| Sample | Thickness (inches) | Alkali Metal Treating Salt | Exchange Temp., °F. | Exchange Time (minutes) | Sodium or Potassium Penetration |
|---|---|---|---|---|---|
| B | 0.250 | Sodium nitrate | 900 | 22 | 250 |
| C | 0.250 | do | 900 | 24 | 250 |
| D | 0.250 | do | 900 | 25 | 250 |
| J | 0.250 | do | 900 | 38 | 250 |
| 3 | 0.250 | do | 900 | 40 | 200 |
| 4 | 0.250 | Potassium nitrate | 925 | 15 | 6 |
| 5 | 0.250 | do | 925 | 15 | 6 |

Samples B, C, D, J, 1, 2, 3, 4 and 5 were subjected to moisture humidity testing. The moisture humidity test was performed in an insulating electric coil heated, air incubation oven. The heating was conducted at atmospheric pressure in recurring 90-minute heating and cooling cycles with 90 minutes of cooling and so forth. During the heating cycles the temperature inside the oven was raised to a temperature of 140° F. to 150° F. During the cooling cycle the temperature was reduced to 120° F. which temperature was maintained during cooling.

The samples were placed on stainless steel racks mounted in a 2-foot by 1.5-foot by 1.5-foot glass tank (stainless steel frame). The tank contained water filled to a depth of one inch from the tank bottom. The stainless steel racks were mounted in the tank about 2 inches above the bottom of the tank. During the heating periods the moisture-vapor conditions in the oven tended to cause evaporation of the water so that a condition of nearly 100 percent relative humidity is reached in the tank. During the cooling periods the moisture vapor condenses on glass surface thus promoting moisture attack on the glass.

The samples were exposed continuously to moisture-vapor attack for the time periods noted below in Table 3. The moisture resistance of each sample was evaluated visually after removal from the test cabinet. The test results are given below in Table 3.

The moisture resistance values of each sample were arrived at by holding the samples at an angle of between about 30 to 45 degrees to the source of light and visually evaluating the samples for degree of staining in a source of light. The source of light can be sunlight or any convenient "point" source of light, e.g., a slide projector lamp or a motion picture projector lamp. The degree of stain was expressed numerically according to the following visual evaluation criteria.

Degree of stain:

1=Excellent, no visible etching or staining
2=Discoloration to medium etch
3=Heavy etch to light stain
4=Light to medium stain
5=Medium stain
6=Medium to heavy stain
7=Heavy stain Glass plates intended for use as viewing closures are usually rejected when the stain degree is 4 or above.

TABLE 5

| Sample | Exposure Time to Moisture Vapor Attack (hours) | Degree of Stain |
|---|---|---|
| B | 120 | 1 |
| C | 72 and 120 | 1 |
| D | 120 | 1 |
| J | 120 | 1 |
| 1 | 72 | 7 |
| 2 | 72 | 5 |
| 3 | 72 and 120 | 1 |
| 4 | 36 | 7 |
| 5 | 72 | 6 |

As is apparent from these test results, the durability of the $P_2O_5$ containing alkali metal strengthened glass samples B, C, D and J produced in accordance with this invention is far superior to samples 1, 2, 4 and 5, inclusive.

While the alkali metal exchange induced strengthening of the $Li_2O-Na_2O-P_2O_5-Al_2O_3-SiO_2$ glasses shown above in the examples has been by sodium exchange treatment, it should be realized that said glasses can be strengthened by treatment with a suitable salt of an alkali metal having a larger atomic diameter than lithium, viz., potassium, cesium and rubidium.

For example, Composition C was strengthened by potassium exchange treatment in molten potassium nitrate conducted at 850° F. for 270 minutes on test samples 0.250 inch thick to secure potassium penetration depths of 64 microns (depth of surface compressive stress zone).

While the penetrations attainable with a single exchange strengthening treatment using potassium salts are less than those attainable with a sodium exchange, the maximum surface compressive stress attainable by potassium exchange treatment usually exceeds that attainable by sodium treatment.

Instead of performing a single alkali metal exchange strengthening treatment, a plurality of such treatments can be performed on the $Li_2O-Na_2O-P_2O_5-Al_2O_3-SiO_2$ glasses with each succeeding alkali metal exchange treatment being conducted using a salt of an alkali metal having a larger atomic diameter than the alkali metal employed in the preceding strengthening treatment. All the alkali metal strengthening treatments are usually conducted below the glass strain point. For example, the selected $Li_2O-Na_2O-P_2O_5-Al_2O_3-SiO_2$ glass can be first exchanged strengthened by sodium exchange followed by later potassium exchange strengthening treatment. Moreover, subsequent serial exchange treatments can be performed using first rubidium and then cesium salts, respectively.

In the production of the articles of this invention with exchange treating baths which are used over extended periods of time when a plurality of glass articles are successively immersed in the various molten alkali metal treating baths, the composition of the baths can be controlled to prevent alkali attack upon the glass surfaces being treated. Where alkali build-up is problematic, a buffering material can be used to neutralize the alkali (OH) in the treating bath. For example, $SO_2$ gas can be bubbled through the molten sodium salt bath periodically during the treatment campaign to counteract build-up of alkali. Of course, $SO_2$ gas can likewise be employed to combat alkali build-up in a potassium treating bath.

Another problem involved in long treatment campaigns is that of contamination of the sodium salt bath by lithium from the glass. If the build-up of lithium is high enough, the rate of exchange and sodium penetration can be adversely affected.

In general, for uniform treating results in the sodium treatment, the lithium content of the sodium salt bath is held below 3.0 percent by weight and preferably below 1.0 percent by weight based upon the combined weight of lithium and sodium in the bath. Most preferably the lithium content is maintained at a level ranging downwardly from 1.0 percent by weight to a value approaching and even reaching 0.0 percent by weight. In such a treatment procedure the lithium content of the molten sodium treating bath should usually not be permitted to vary more than 1, and preferably less than 0.5 percent by weight (based upon the total combined weight of lithium and sodium in the molten sodium salt) from the early (low lithium content) stage of immersion to the later (higher lithium content) stage thereof, even though pluralities of glass articles are dipped over a period of 1 to 20 weeks. In order to counteract the build-up of lithium in the sodium salt exchange treating bath, the bath composition can be adjusted by periodic addition of sodium salt in an amount sufficient to replace consumed or withdrawn sodium, thus enabling a favorable concentration of sodium salt to be maintained in the molten sodium salt treating bath. Also, portions of the bath can be withdrawn, purified, and then recycled back for treatment; of course, the same control is usually exercised over a potassium salt bath when a potassium exchange treatment is employed for strengthening.

The present invention can be employed to produce glass articles which are also subjected to conventional processing techniques, such as thermal tempering (preferably performed prior to the exchange strengthening treatment or treatments); and laminating operations; etc., to produce glass articles having enhanced surface strength, impact and penetration resistance, durability, etc.

This invention can be employed to produce strengthened glass articles of all types, e.g., sheets; windshields; automobile sidelights and backlights; building materials; architectural glass or spanrels; skylights; bottles, plates; casseroles, saucers, cups, bowls and other tableware; drinking glasses and goblets; viewing closures, such as window panes and glass doors; safety-glass and other laminated viewing closures and structures; glass insulation structures wherein a plurality of glass sheets are arranged in spaced fashion with a layer of air serving as the insulation medium; television safety glass implosion and/or explosion shields; ophthalmic lenses for eyeglasses, goggles, etc.; glass roofs or transparent domes in vehicles and buildings; experimental devices such as glass engine parts which must withstand a high compression; ceramic and siliceous articles used in the dental art such as dentures and crown caps; ceramic mufflers for automobiles, airplanes and other vehicles; etc.

While the alkali metal exchange strengthening treatments can be conducted effectively by immersion of the glass in a molten bath, other methods of treatment can be used. Thus, the glass can be sprayed or otherwise provided with a coating of the exchange treating salt without preheating the glass, and the glass then can be heated to a temperature at which the exchange treatment is effected.

Another non-immersion exchange strengthening procedure which can be employed involves use of a paste comprised essentially of the alkali metal treating salt (60 to 90 percent) by weight and an inert thixotropic diluent (10 to 40 percent by weight) e.g. Attapulgus clay. In non-immersion alkali metal exchange strengthening treatments, care should be exercised to insure adequate contact of the treating medium with the glass.

For forming safety-glass type and other laminates with the ion exchange strengthened glasses of this invention, any suitable preformed or cast-in-place interlayer material can be employed. Exemplary cast-in-place interlayers can be of the polyurethane type, such as the polyurethane compositions as disclosed in Ser. No. 68,942 of Wismer et al., filed Nov. 14, 1960, and now abandoned, and Ser. No. 68,943 of Ammons et al., filed Nov. 14, 1960, and now abandoned, the disclosures of both of which are incorporated herein by reference. Other exemplary interlayer materials are polyvinyl butyral resins, polysiloxane resins, etc.

*Example 4*

Various glass compositions were tested to determine their acid durability. The compositions investigated were A, C, K, L, M, N, O, P, Q and R. Compositions A and B have been presented earlier. Compositions K, L, M, N, O, P, Q and R are presented below:

The acid durability test begins with the preparation of an aqueous ½ percent by weight solution of sulphuric acid. Samples of each of the above test compositions 1 inch wide by 2 inches long by ¼ inch thick were prepared using convention forming techniques. Each sample's total surface area, including its sides, was accurately measured. Each sample was also carefully weighed. The samples were then subjected to the ½ percent sulphuric acid aqueous solution for a period of 30 minutes at a temperature of 100° C. by immersing each sample in a beaker containing the boiling solution. After each 30-minute immersion test, the sample was removed and again accurately weighed to determine weight loss. The weight loss was divided by the total area of the sample in contact with the acid solution and the result reported in terms of the weight loss in grams per square centimeter of glass surface. This number was then multiplied by 2 to yield the total weight loss per square centimeter of glass per hour subjected to the acid test bath.

In part one of this experiment, the samples were tested prior to any ion exchange treatment. The test was of the acid durability of the base glass composition alone. The following table presents the results of the acid durability test. The smaller the weight loss per unit area, the greater the acid durability of the composition indicated. The data listed is the average result of three samples tested separately for each composition.

TABLE 6

| Composition: | Weight Loss in grams per Square Centimeter per hour |
|---|---|
| A | .20 |
| C | 37.00 |
| K | .03 |
| L | .00+ |
| M | .02 |
| N | .03 |
| O | .04 |
| P | .03 |
| Q | .02 |
| R | .08 |

In part two of this experiment, samples identical to those used in part one of the K and C compositions were first ion exchanged in a sodium ion exchange salt bath, in accordance with the technique of Example 1. The test samples of the C and K compositions were then given the same acid durability test of part one of this experiment. Composition K (ion exchanged) was found to have a weight loss in grams per square centimeter per hour of .07, and composition C (ion exchanged) was found to have a weight loss of 25.6 grams per square centimeter per hour.

The increased acid durability exhibited by certain of the glass compositions tested is believed to be due to the decreased $P_2O_5$ and $Al_2O_3$ contents and the increased $SiO_2$ and $ZrO_2$ contents.

Enhanced durability is obtained if the compositions contain the following preferred weight percentages:

| Component | K | L | M | N | O | P | Q | R |
|---|---|---|---|---|---|---|---|---|
| $SiO_2$ | 56.38 | 55.33 | 57.38 | 57.38 | 57.38 | 57.88 | 57.38 | 55.88 |
| $Al_2O_3$ | 19.61 | 18.61 | 17.61 | 19.61 | 19.61 | 17.61 | 19.61 | 17.61 |
| $Li_2O$ | 5.04 | 5.04 | 5.04 | 5.04 | 5.04 | 5.04 | 5.04 | 5.04 |
| $P_2O_5$ | 2.96 | 4.96 | 3.96 | 3.96 | 3.96 | 3.96 | 3.96 | 4.96 |
| $Na_2O$ | 7.00 | 9.00 | 7.00 | 9.00 | 10.00 | 7.00 | 9.00 | 7.50 |
| $ZnO$ | 2.00 | 2.00 | 1.00 | | 2.00 | | 3.00 | 2.00 |
| $B_2O_3$ | 5.00 | 3.00 | 6.00 | 3.00 | | 6.50 | | 5.00 |
| $ZrO_2$ | 2.00 | 2.00 | 2.00 | 2.00 | 2.00 | 2.00 | 2.00 | 2.00 |

$SiO_2$ between 50.0 and 60.0 percent;
$Al_2O_3$ between 15.0 and 22.0 percent;
$Li_2O$ between 3.0 and 6.0 percent;
$P_2O_5$ between 2.5 and 7.0 percent;
$Na_2O$ between 4.0 and 11.0 percent;
$ZnO$ between 0.0 and 4.0 percent;
$B_2O_3$ between 0.0 and 8.0 percent; the sum total of ZnO and $B_2O_3$ between 1.0 and 8.0 percent; and
$ZrO_2$ between 1.0 and 5.0 percent

Example 5

Four samples of glass 4 inches by 4 inches by 0.1 inch thick of composition C were fabricated using conventional forming techniques. The samples were then ion exchanged in a potassium nitrate bath using the technique discussed in Example 1 used for the sodium nitrate exchange. The samples were potassium ion exchanged for 45 minutes at 900° F.

The modulus of rupture for each of the samples was determined using the concentric ring load test. The results are tabulated in Table 7 below:

TABLE 7

| Sample No. | Breaking Load in Pounds | Calculated Modulus of Rupture (Concentric Ring Test) Pounds per square Inch |
|---|---|---|
| 1 | 3,055 | 73,500 |
| 2 | 2,990 | 72,500 |
| 3 | 3,000 | 72,500 |
| 4 | 2,855 | 72,100 |

The average modulus of rupture strength calculated from the above data is 72,650 pounds per square inch. The concentric ring test consists of supporting the sample on a 3-inch in diameter ring and positioning a 1.5-inch diameter ring in the center above the sample being treated. The sample is tested by lowering the smaller ring until breakage occurs. The modulus of rupture is then calculated from the breaking load in pounds using the formula:

$$S = \frac{.242 W}{T^2}$$

where S equals the modulus of rupture in pounds per square inch, W equals the breaking load and T equals the thickness of the sample in inches.

Example 6

Six lenses were prepared from the C glass composition using conventional forming techniques. The sample lenses were about 2 inches by 1½ inches by 0.152 inch thick.

The lens samples were ion exchanged at 950° F. for 30 minutes in a potassium nitrate bath. The lenses were found to exhibit an average strength of 129,000 pounds per square inch.

The concentric ring load test was used in testing these lenses. The support ring was 1.41 inches in diameter, and the upper ring was 0.5 inch in diameter. The sample was stressed and broken by lowering the 0.5 inch diameter ring onto the sample. The breaking load measurement was converted into a modulus of rupture measurement using a formula similar to that used for the 4 by 4 by .01 inch samples noted in Example 5.

A sample of the composition C lens was sliced to obtain a 0.020 inch section from which a stress profile was determined. The stress profile indicated that the surface compressive stress was approximately 41,500 microns per inch and that the compressive layer extended between 20 and 24 microns into the interior of the glass. Only slight center tension was developed.

Example 7

Five lenses of composition C were fabricated using conventional melting and forming techniques. The lenses were approximately 1.5 inches by 2.0 inches by 0.130 inch thick.

The lenses were each ion exchanged in a potassium nitrate bath for 30 minutes at 900° F. The lenses were then tested using the concentric ring loading test of Example 6. The modulus of rupture strengths for the samples are listed in the table below:

TABLE 8

| Sample No.: | Modulus of Rupture in Pounds per Square Inch |
|---|---|
| 1 | 163,400 |
| 2 | 173,800 |
| 3 | 160,000 |
| 4 | 156,500 |
| 5 | 169,000 |

The average modulus of rupture strength for the five lens samples was 164,500 pounds per square inch.

Example 8

Ground and polished test plates of Glass Composition C as described in Example 1 above, 6 inches long by 6 inches wide by approximately 0.10 inch thick, were cleaned with n-propyl alcohol for a short period of time at room temperature (70° F.±10° F.). Then pairs of these cleaned 6 inch by 6 inch by 0.10 inch test plates of Glass Composition C were laminated using a polyurethane resin employing the procedure as folows. One glass plate was positioned horizontally on a support member. Then a spacer element 0.10 inch thick was positioned on top of this plate. Thereafter, an upper plate of the same size and glass composition was positioned on top of the spacer element. This assembly was then taped about three of its edges so that the tape enclosed the peripheral area (perimeter) of the assembly about three of its 6 inch edges. Thereafter Mylar 853 tape (polyethylene glycol terephthalate) approximately 1 inch wide was fitted snugly against the previously said three edges with the excess Mylar tape being folded over and adhered to the top and bottom plates.

Then double adhesive-faced masking tape was placed completely around the upper and lower surface of the previously untaped edge for the entire 6 inch dimension thereof. Thereafter, aluminum foil approximately 3 inches wide was placed around and adhered to the free adhesive surface of the double faced masking tape, thus providing a funnel in which the polyurethane resin interlayer was cast.

The assembly was then positioned vertically and the spacer element removed therefrom. Then the assembly was preheated to a temperature of approximately 285° F.±10° F. for a period of two hours to remove the volatiles from the adhesive surface of the tape exposed between the edges of the glass plates.

A liquid prepolymer polyblend was then formed by mixing 40 weight parts of a poly(tetramethylene oxide) glycol having a molecular weight from 550 to about 3000 (as disclosed in said Wismer et al. application Ser. No. 68,942 referred to above) and 60 weight parts of a liquid prepolymer of a poly(tetramethylene oxide) glycol having an average molecular of from 550 to about 1800 (as disclosed in said Ammons et al. application Ser. No. 68,943 referred to above). The above polyblend mixture is referred to here and after as the "liquid prepolymer."

The liquid prepolymer was heated under anhydrous conditions for a 30-minute period at a temperature of approximately 200° F. Then, while maintaining a temperature of approximately 200° F., the liquid prepolymer was degassed by stirring with a magnetic stirrer for 15 minutes under anhydrous conditions and using a vacuum to remove gases from the liquid prepolymer. At the same time, the curing system was prepared by mixing 7.3 weight parts of 1,4-butanediol with 0.72 weight part of trimethylol propane. The mixture of curing materials was then placed in a vacuum oven and heated to a temperature of approximately 180° F. over a 30–60 minute period.

The degassed resin was then cooled to a temperature of approximately 180° F.–185° F. by removing the resin from its heating mantle. The curing system was then added to the degassed liquid prepolymer while stirring until all of the curing agent had been added to form the curable resin-curing agent blend.

Then the mixture of the curing agent component and the liquid prepolymer was degassed for five minutes under anhydrous vacuum conditions at a temperature of approximately 180° F.–185° F. Following this, the degassed prepolymer blend containing the curing agent, uniformly distributed therein, was poured between the vertically oriented glass assembly filling said assembly until said blend was level with the top edge of the glass plates. This took approximatey two to three minutes.

The glass-polymer-glass vertical assembly was then placed in an oven and heated at a temperature of approximately 285° F. for a period of approximately 6 hours to cure the resin in place between the glass plates. After curing the laminated assembly was removed from the oven.

Adhesion tests (peel strength tests) reveal that the adhesion between the glass and the polyurethane interlayer material is greater than the cohesion of the polyurethane interlayer material, itself, thus illustrating the excellent nature of the adhesive bond of the polyurethane interlayer material and the glass.

Cold chipping tests were conducted to determine the resistance of the laminate to low temperature delamination, viz., separation of glass from plastic. The cold chipping test is performed by chilling the laminate to a temperature of approximately −80° F. for 24 hours and then removing the laminate from the cooling chamber, thus exposing it to room temperature conditions. The laminate is then inspected for delamination of glass or plastic (chipping). No chipping was observed after chilling the laminates as prepared above to a temperature of −80° F. for a 24-hour period. Under similar test conditions, laminates prepared as above have withstood temperatures as low as −95° F. without delamination occurring.

Laminates prepared as described above were also subjected to elevated temperature resistance tests, wherein the above laminates were heated at temperatures of 160° F.–170° F. for various periods of time. Exposure of these laminates to the above temperatures for at least 50 hours failed to reveal either bubbling or discoloration of the laminates.

*Example 9*

A glass-plastic-glass laminate containing a high temperature resistant silicone interlayer was prepared by laminating two outer plies of Glass Composition C described above in Example 1, each having a thickness of approximately 0.10 inch, to "Silastic K" interlayer material having a thickness of approximately 0.10 inch. "Silastic K" is a transparent, polymethyl siloxane elastomer sold by the Dow-Corning Corporation. The laminate was prepared as follows:

Two 6-inch by 6-inch by 0.10-inch polished glass plates of Glass Composition C were cleaned by spraying both surfaces with "Windex" glass cleaner which was then removed by wiping repeatedly with clean cloths. One of the glass plates was then laid on a horizontal surface and the "'Silastic K" applied thereto.

Four plies of "Silastic K" each approximately 0.025 inch thick were individually applied, one on top of the other to the upper surface of the glass plate. The "Silastic K" is supplied as uncured, soft preformed plastic sheet calendared between two polyethylene coated paper sheets. These sheets were cut to 6-inch by 6-inch square sheets. Prior to assembly one sheet of said protective paper was removed from the "Silastic K" sheet. One edge of the interlayer sheet was then aligned with an edge of the glass plate with the exposed interlayer surface facing the surface of the glass plate. The exposed surface of the interlayer sheet was then gradually brought in contact with the glass surface in order that air bubbles could be worked out and wrinkles would be avoided. After the complete surface of the interlayer was "worked" into contact with the glass surface, the polyethylene coated protective paper was removed from the non-glass contacting surface of the "Silastic K." The polyethylene coated protective paper was also removed from one surface of a second 6-inch square of "Silastic K" and the exposed surface of this second sheet was "worked" onto the exposed surface of the first ply in the same manner. The third and fourth plies of "Silastic K" were also applied in the same manner. After the fourth sheet of "Silastic K" was applied the polyethylene coated protective paper was removed from the upper surface thereof and the second glass plate was applied thereto.

The preliminary "glass-Silastic K-glass" assembly was then wrapped in a 12 inch to 14 inch square sheet of "Teflon" (polytetrafluoroethylene) to protect the assembly during subsequent operations.

The "wrapped" preliminary assembly was then placed on a sheet of Mylar sufficiently large that it could be folded to entirely cover both surfaces leaving an excess or overhang of two to three inches of material around three edges of the wrapped assembly, which overhang was subsequently heat sealed. The fourth edge, the edge consisting of the fold did not require heat sealing.

Heat sealing was accomplished by positioning the Mylar enclosed preliminary assembly over a U-shaped resistance heating element in an evacuation chamber. The chamber and the Mylar enclosed assembly contained therein was evacuated for approximately two minutes to remove entrapped air bubbles and "pre-press" the assembly. The heating element then raised the temperature of the excess peripheral Mylar material to 300° F. causing both the upper and lower members of the folded Mylar sheet to soften, become tacky, and adhere to one another thereby heat sealing the excess Mylar around the above mentioned three edges at the wrapped assembly.

Upon removal from the heat sealing evacuation chamber the pre-pressed unit was positioned on a rack in an oil autoclave. The autoclave was filled with oil and a circulating pump built up a pressure head of 200 pounds per square inch. When this pressure was achieved, the temperature of the oil was increased to 300° F. This temperature was maintained for 30 minutes during which time the assembly was pressed and the interlayer material was cured. The autoclave oil was then cooled to 120° F., and sufficient oil was removed to permit access to the interior of the autoclave and pressed assembly contained therein.

The Mylar bag was then cut and removed from the assembly, the "Teflon" wrapping material was removed and the assembly was post cured in an electrically heated oven at a temperature of 300° F. After 24 hours the assembly was removed from the oven and placed in a cooling rack to cool at room temperature.

It is also within the purview of this invention to provide coatings on the ion exchange strengthened glass articles. If the glass articles are going to be fabricated into laminates, especially safety glass-type laminates such as those employed in aircraft, the coatings are deposited onto the glass after the ion exchange strengthening treatment but before the laminating procedure. Two exemplary types of coatings which can be provided on the strengthened glass articles of this invention are radar reflective coatings, e.g., radar reflective coatings having a conductivity of approximately 5 to 10 ohms per square area, and visual anti-reflective coatings, for example, mono, di or trilayer coatings of dielectric material, e.g., magnesium fluoride.

Since the ion exchange strengthened glasses of this invention should be provided with any desired coating materials using coating procedures involving temperatures below the strain point of the particular glass chosen, it is preferred to employ coating procedures which can be performed at low to medium-low temperatures, viz., temperatures usually not exceeding approximately 850–1100° F. For this reason the coatings will usually be deposited by vacuum evaporation and vacuum sputtering techniques. However, any of the other conventional methods of depositing radar reflective and/or visual anti-reflective coatings can be employed as long as the processing temperatures used for the coating operation do not exceed the strain point of the particular glass in question. Usually, the coating operations will be conducted at temperatures of at least 50° F. below the glass strain point, and more preferably at temperatures of at least 100° F. below the glass strain point.

Although the present invention has been illustrated in great detail in the examples, it is not intended that such details serve as limitations upon the spirit and scope of this invention. The present invention in its broadest aspects is not necessarily limited to the specific compositions, temperatures and treatment times specified in the foregoing examples.

I claim:

1. In a method of chemically tempering a glass article by introduction therein of a larger alkali metal by alkali metal ion exchange below the strain point of the glass article the improvement comprising, using as said glass article a lithia-$P_2O_5$-alumina-silica glass containing from about 1 to 25 percent by weight $P_2O_5$ and an alkali metal oxide selected from the group consisting of $Na_2O$, $K_2O$ and mixtures thereof.

2. The method of claim 1 wherein the alkali metal oxide is $Na_2O$ present in an amount of from about 2 to 20 percent by weight.

3. A method of treating a glass comprising in its essential components about 30 to 65 percent by weight $SiO_2$, about 10 to 35 percent by weight $Al_2O_3$, about 2 to 15 percent by weight $Li_2O$, about 2 to 20 percent by weight $Na_2O$, and about 1 to 25 percent by weight $P_2O_5$, which method comprises contacting said glass with a molten salt of an alkali metal above lithium in the atomic series at a temperature below the strain point of said glass for a sufficient period of time to introduce said alkali metal into the surface of said glass.

4. A method according to claim 3 wherein said alkali metal is sodium.

5. A method according to claim 3 wherein said alkali metal is potassium.

6. A method of treating soda-lithia-$P_2O_5$-alumina-silica glass containing from 2.5 to 20 percent by weight $P_2O_5$ and from 3 to 18 percent by weight $Na_2O$ which comprises contacting said glass with molten sodium nitrate at a temperature below the strain point of said glass for a sufficient period of time to introduce sodium into the surface of said glass and substantially increase the compressive stress thereof.

7. A method of treating soda-lithia-$P_2O_5$-alumina-silica glass containing from 2.5 to 20 percent by weight $P_2O_5$ and from 3 to 18 percent by weight $Na_2O$ which comprises contacting said glass with molten potassium nitrate at a temperature below the strain point of said glass for a sufficient period of time to introduce potassium into the surface of said glass and substantially increase the compressive stress thereof.

8. A method of treating a glass comprising about 43 to 56 percent by weight $SiO_2$, about 25 to 27 percent by weight $Al_2O_3$, about 4 to 7 percent by weight $Li_2O$, about 3.5 to 12 percent by weight $Na_2O$, and about 8 to 12 percent by weight $P_2O_5$, which method comprises contacting said glass with a molten salt of an alkali metal above lithium in the atomic series at a temperature below the strain point of said glass for a sufficient period of time to introduce said alkali metal into the surface of said glass.

9. A method of treating a glass consisting essentially of about 44 percent by weight $SiO_2$, about 27 percent by weight $Al_2O_3$, about 5 percent by weight $Li_2O$, about 11 percent by weight $Na_2O$, about 10 percent by weight $P_2O_5$, and about 3 percent by weight ZnO, which method comprises contacting said glass with a molten salt of an alkali metal above lithium in the atomic series at a temperature below the strain point of said glass for a sufficient period of time to introduce said alkali metal into the surface of said glass.

10. A method of treating a glass consisting essentially of about 50 to 60 percent by weight $SiO_2$, about 15 to 22 percent by weight $Al_2O_3$, about 3 to 6 percent by weight $Li_2O$, about 2.5 to 7 percent by weight $P_2O_5$, about 4 to 11 percent by weight $Na_2O$, about 0 to 4 percent by weight ZnO, about 0 to 8 percent by weight $B_2O_3$, and about 1 to 5 percent by weight $ZrO_2$, wherein the total content of ZnO plus $B_2O_3$ is about 1 to 8 percent by weight, which method comprises contacting said glass with a molten salt of an alkali metal above lithium in the atomic series at a temperature below the strain point of said glass for a sufficient period of time to introduce said alkali metal into the surface of said glass.

11. The article produced by the method of claim 1.
12. The article produced by the method of claim 3.
13. The article produced by the method of claim 8.

References Cited

UNITED STATES PATENTS

| | | | |
|---|---|---|---|
| 3,017,279 | 1/1962 | Van Dolah et al. | 65—33 |
| 3,218,220 | 11/1965 | Weber | 65—30 |
| 3,236,610 | 2/1966 | McMillan et al. | 65—33 |

FOREIGN PATENTS

| | | |
|---|---|---|
| 62/2352 | 3/1962 | Republic of South Africa. |
| 62/2353 | 3/1962 | Republic of South Africa. |

OTHER REFERENCES

Kistler: "Stresses in Glass Produced by Nonuniform Exchange of Monovalent Ions," J. of Amer. Cer. Soc., February 1962, vol. 45, No. 2, pp. 59–68.

Mochel: "Improved Method of Glass Treatment and Product," Pat. Journal, Nov. 21, 1962, p. 22 (62/2353 relied upon).

HOWARD R. CAINE, *Acting Primary Examiner.*

S. LEON BASHORE, DONALL H. SYLVESTER,
*Examiners.*

G. R. MYERS, *Assistant Examiner.*